Sept. 5, 1972   J. E. EICHENLAUB   3,689,335
HEAT SEAL METHOD
Original Filed Oct. 5, 1966   3 Sheets-Sheet 1

INVENTOR.
JOHN E. EICHENLAUB
BY
Braddock & Bird
ATTORNEYS

Sept. 5, 1972   J. E. EICHENLAUB   3,689,335
HEAT SEAL METHOD
Original Filed Oct. 5, 1966   3 Sheets-Sheet 2
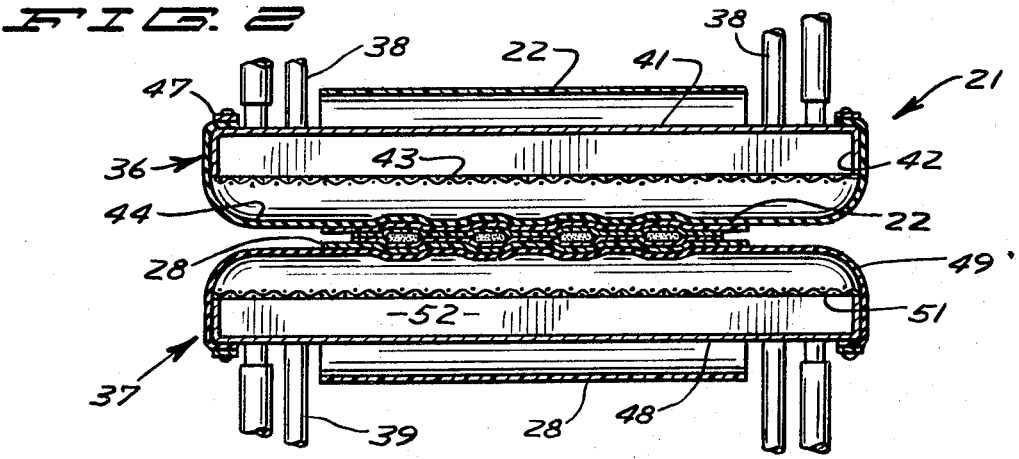
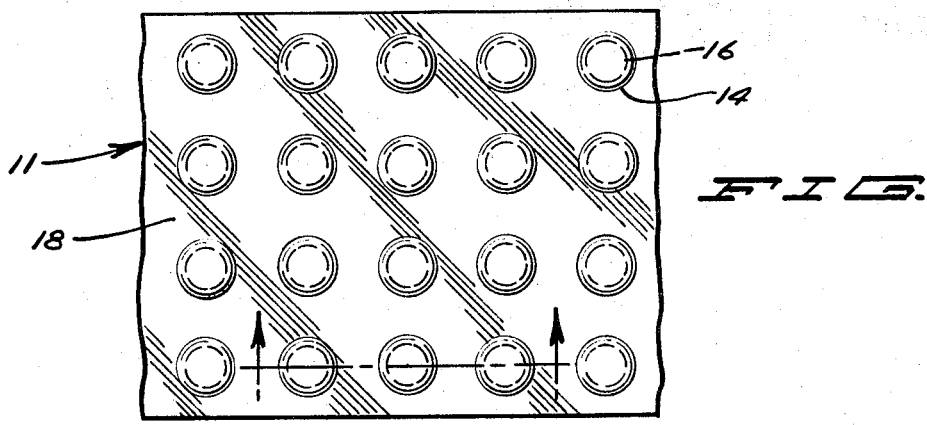
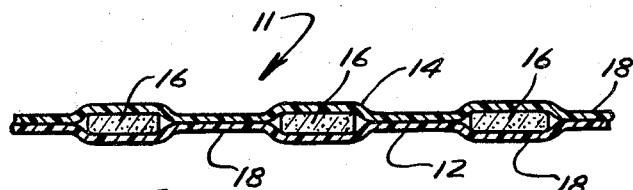
INVENTOR.
JOHN E. EICHENLAUB
BY
Braddock & Burd
ATTORNEYS Sept. 5, 1972     J. E. EICHENLAUB     3,689,335
HEAT SEAL METHOD
Original Filed Oct. 5, 1966     3 Sheets-Sheet 3
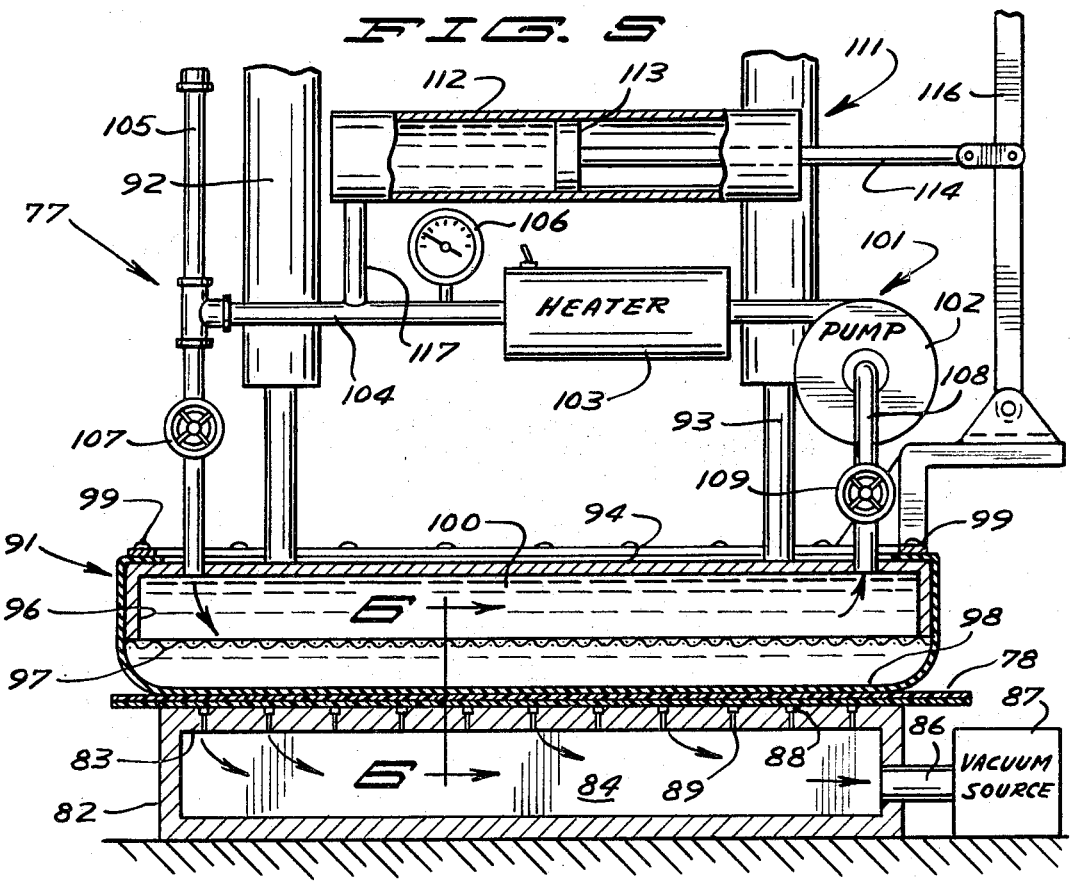
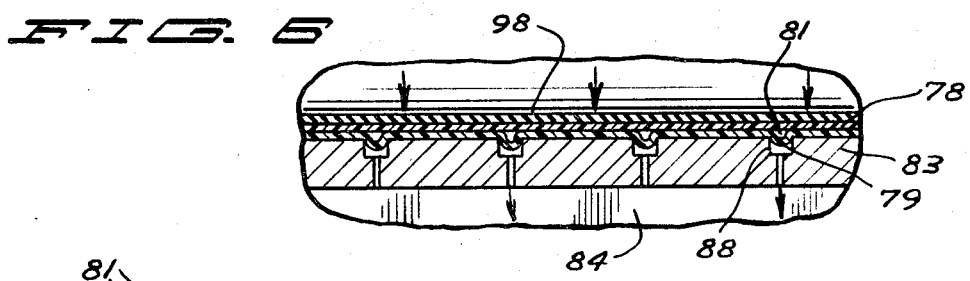
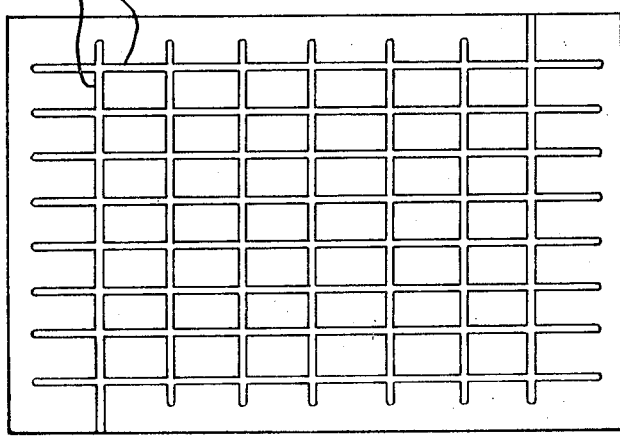
INVENTOR.
JOHN E. EICHENLAUB
BY
Braddock & Burd
ATTORNEYS United States Patent Office 3,689,335
Patented Sept. 5, 1972

3,689,335
HEAT SEAL METHOD
John E. Eichenlaub, 9321 Franklin Ave. W.,
Minneapolis, Minn. 55426
Original application Oct. 5, 1966, Ser. No. 584,564.
Divided and this application Dec. 1, 1969, Ser.
No. 879,953
Int. Cl. B29c 11/06, 27/02
U.S. Cl. 156—73                                   7 Claims

ABSTRACT OF THE DISCLOSURE

A method for welding heat sealable sheet members together with heated fluid moving under pressure in a platen having a chamber with a side closed with a flexible thin nonelastic membrane. The nonelastic membrane has a surface area exposed to the chamber which is larger than the cross-sectional area of the chamber. The membrane moves toward the sheet members when heated fluid under pressure is introduced into the chamber, whereby both heat and pressure are transferred to the sheet members to weld the sheet members together. Prior to the welding of the sheet members, portions of one sheet member are moved away from the other sheet member to provide spacing between non-welded portions of the sheet member.

---

This is a division of application Ser. No. 584,564, filed Dec. 1, 1969.

This invention relates to an apparatus and method for welding heat sealable sheet material. More particularly the invention relates to an apparatus and a method for welding superimposed heat sealable sheet members and forming spaces between the sheet members.

Briefly described, the heat sealing apparatus of this invention has a support means providing a surface for receiving sheets of heat sealable material. The sheets of heat sealable material are welded or fused together by keeping a fluid filled platen in constant pressure relationship with respect to the surface. When the fluid is heated and under pressure it serves to weld the heat sealable sheet material together. The platen has a chamber closed with a thin flexible membrane which when pressed forward is in surface engagement with one of the sheet members. In some applications an intervening flexible slip sheet is interposed between the sheet members and the membrane. A fluid circuit means distributes a supply of fluid through the chamber in the platen. Included in this circuit means is a pump for circulating the fluid through the platen, a heater for increasing the temperature of the fluid and control means for sensing the temperature of the fluid in the system as well as regulating the pressure of the fluid. A cylinder means can be used to vary the pressure of the fluid in the system. The membrane of the platen, being flexible, is urged by the pressure of the fluid toward the sheet members positioned on the support forcing the sheet members into contact with each other. The heat of the fluid in the platen is readily and uniformly transferred through the thin membrane. The temperature of the fluid can be accurately regulated and is relatively uniform across the entire surface of the membrane. The pressure of the fluid transmits itself uniformly through the diaphragm within its range of flexibility. The combination of heat and pressure transmitted from the fluid through the diaphragm effectively heat seals or welds the sheet members together. The diaphragm is retracted to a withdrawn position by moving fluid from the platen to an expansion chamber or reservoir. The reservoir also compensates for volume changes due to vaporization and fluid loss. This permits removal of the welded sheet and insertion of new sheet members under the diaphragm of the platen. The support means of the apparatus can be a second platen having a thin flexible membrane facing the membrane of the first platen. The support means may be rigid surfaces which move transversely beneath the platen with a slip sheet moving at the same rate of speed between the platen membrane and the heat sealable sheet material. This permits continuous rather than intermittent processing of material.

The method of welding heat sealable sheet members includes the steps of placing at least two sheets of heat sealable material in superimposed relation on a flat supporting surface. The sheets of material are fused together by simultaneously applying heat and pressure over an area of the sheet material pressing the sheet material toward the flat surface with a flexible diaphragm subjected to heated fluid under pressure. After the diaphragm has been withdrawn from the sealed sheet material the welded sheet is removed from the flat surface.

In the drawings:

FIG. 1 is a diagrammatic view of the apparatus for continuously encapsulating articles between heat sealable sheet members;

FIG. 3 is a plan view of the sheet members encapsulating articles;

FIG. 4 is an enlarged sectional view taken along the line 4—4 of FIG. 3;

FIG. 5 is a diagrammatic view of a modified apparatus for forming channels in sheet material;

FIG. 6 is an enlarged sectional view taken along the line 6—6 of FIG. 5; and

FIG. 7 is a plan view of welded sheet members formed with material receiving channels.

Figure 2:
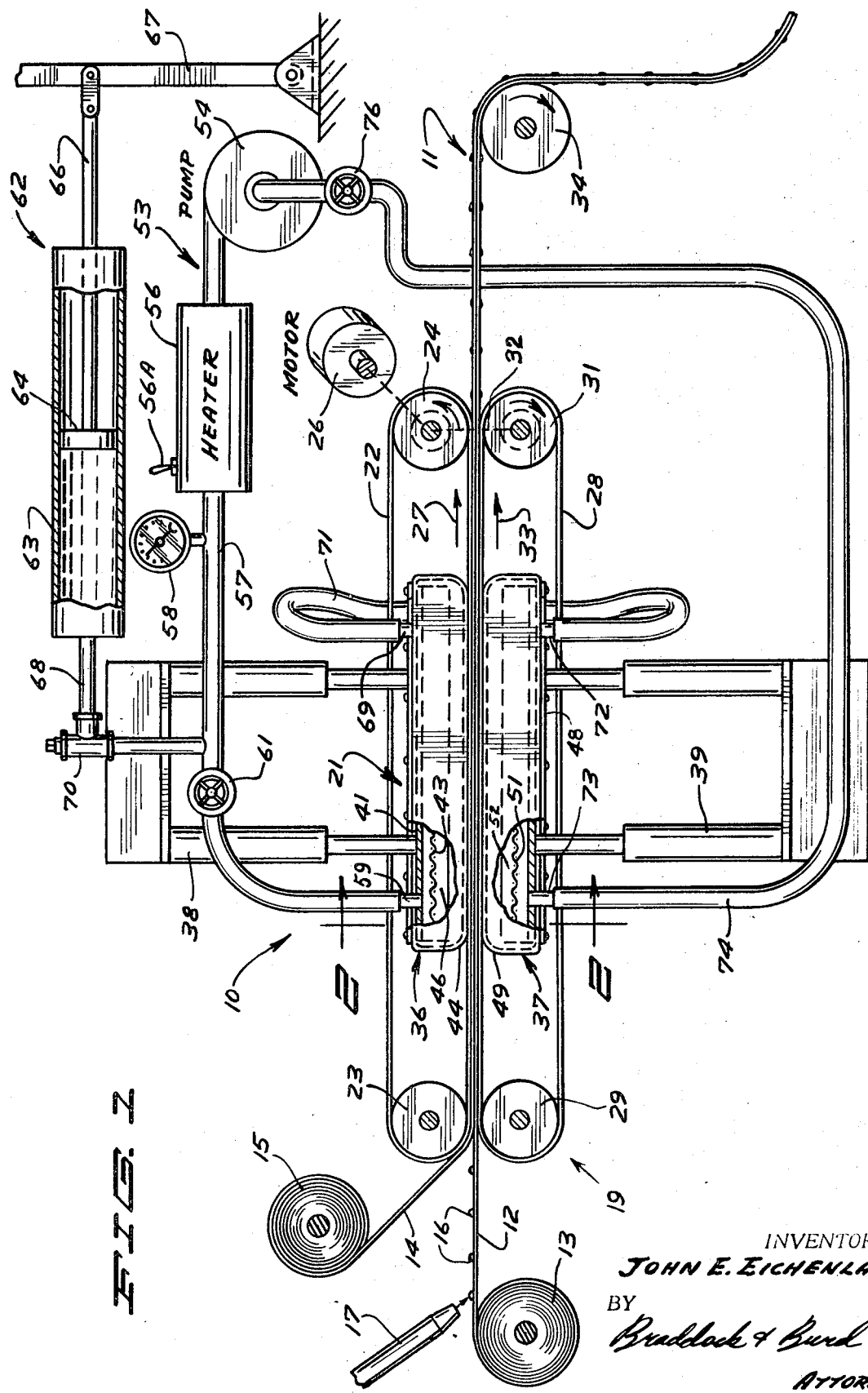
FIG. 2 is an enlarged sectional view taken along the line 2—2 of FIG. 1.

Referring to FIG. 1 of the drawings there is shown the sheet material welding apparatus of this invention indicated generally at 10 illustrating the operative steps of continuously manufacturing an article carrying tape 11. Tape 11 initially comprises a bottom sheet 12 which unrolls from a supply roll 13 and is joined to a top sheet 14 which moves from a supply roll 15. A plurality of articles, material, or like separated elements are deposited on the bottom sheet 12 by a dispenser unit 17 before the sheet moves into apparatus 10. The apparatus 10 places top sheet 14 in superimposed relation over the bottom sheet 12 covering articles 16. Shown in FIGS. 3 and 4, tape 11 has welded heat sealed portions 18 which secure bottom sheet 12 to top sheet 14 confining or encapsulating article 16 between the sheets.

Apparatus 10 comprises a conveyor 19 operable to hold the top sheet 14 in alignment with bottom sheet 12. In use the conveyor 19 moves the superimposed sheets through a combined heat and pressure applying unit indicated generally at 21. Unit 21 simultaneously applies heat and pressure to the sheet members to press the members together and elevate the temperature to a point where the superimposed sheet members are permanently joined or welded to each other.

Conveyor 19 comprises an upper flat belt 22 trained about longitudinally spaced rollers 23 and 24. A motor 26 is drivably connected to roller 24 to move belt 22 around the rollers. The bottom run of the belt moves in the direction of arrow 27. A lower flat belt 28 located below and in alignment with upper belt 22 is trained about rollers 29 and 31 located below and parallel alignment with upper rollers 23 and 24 respectively. Belts 22 and 28 are made of sufficiently thin, flexible and heat conductive material to readily transmit heat and pressure from the fluid within the platen to the sheet members. A drive 32, as a twisted belt, connects roller 24 with roller 31 so that the upper run of belt 28 facing the lower run of the upper belt 22 moves in the direction of arrow 33 at approximately the same speed. As welded tape 11 leaves conveyor 19 it passes over idler roller 34 and is deposited in a storage location.

Combined heat and pressure applying unit 21 comprises upper and lower platens indicated generally at 36 and 37. Platens 36 and 37 cooperate to apply pressure and heat of a fluid medium to the top and bottom runs of belts 22 and 28 to squeeze and heat sheet materials 12 and 14 moved by conveyor 19 between belts 22 and 28. Supports 38 and 39 hold platens 36 and 37 adjacent the facing runs of belts 22 and 28. The platens 36 and 37 are identical in structure and function. The following description is limited to platen 36.

As shown in FIG. 2, platen 36 has a flat rectangular plate 41 secured to support 38. The sides and ends of plate 41 are turned downwardly and form side flanges 42 giving the plate the shape of an inverted pan. A screen 43 secured to the side flanges is located between plate 41 and a thin flexible diaphragm 44. Plate 41 and diaphragm 44 form a chamber 46 divided by screen 43. Diaphragm 44 has a flat surface located adjacent screen 43 and sides which extend upwardly adjacent flanges 42. Fastening members 47, as bolts, secure the diaphragm to the edges of plate 41. Diaphragm 44 is a thin, pliable nonelastic, heat resistant material which is impervious to hydraulic fluid. Examples of suitable diaphragm materials are polyimide films, having for example, a two mil thickness, such as Kapton, a product of E. I. duPont de Nemours & Company, Inc., and Armalon sheet, a glass fiber reinforced fluorocarbon, also by E. I. duPont de Nemours & Company, Inc., as well as aluminum foil.

Platen 37 has a pan shaped plate 48 enclosed with a flexible diaphragm 49. Screen 51 separates chamber 52 formed by plate 48 and diaphragm 49. Platen 37 being located below upper run of belt 28 carrying the sheet material functions as a support in addition to applying heat to the sheet material.

Returning to FIG. 1, the fluid circuit indicated generally at 53 supplies platens 36 and 37 with heated fluid under pressure to expand the platens forcing the heat sealable members into engagement with each other and at the same time subjecting the sheet members to heat to perform the heat seal operation. The fluid in circuit 53 is a liquid, as a silicone fluid, i.e., C. E. Silicone Fluid S.F.–96. Circuit 53 has a pump 54, as a gear, vane or any suitable type of pump, operable to constantly circulate the fluid in the system. Located adjacent the output line of the pump is a heater 56 for raising the temperature of the fluid. The heater 56 can take the form of submerged electrical cartridges having a control switch 56A to provide control of the temperature of the fluid. A line or pipe 57 connected to the output of the heater and to connector 59 on one side of plate 41 carries the fluid from the heater into the chamber 46 of platen 36. A temperature gauge 58 mounted on pipe 57 senses the temperature of the fluid being delivered to platen 36. Line or pipe 57 also has a valve 61 adjustable to regulate the rate of flow of fluid in pipe 57.

A pressure applying means shown as a cylinder unit indicated generally at 62 is used to vary the pressure of the fluid delivered to platen 36. Cylinder unit 62 comprises an elongated cylinder 63 slidably accommodating a piston 64 secured to a piston rod 66. A lever 67 connected to the outer end of the rod is manually movable to move the piston 64 relative to cylinder 63 forming an expandable and contractable chamber for changing the pressure of the fluid in the system. Line 68 connects cylinder 63 to pipe 57 upstream from valve 61. A plugged inlet 70 is provided in line 68 for filling the fluid system.

Fluid delivered to platen 36 flows through chamber 46 to a discharge coupling 69 connected to a line 71 extended around belts 22 and 28 to an inlet coupling 72 on the lower platen 37. Fluid is discharged through coupling 72 into chamber 52 of the platen 37. The fluid flows through chamber 52 to a coupling 73 located on the opposite side of plate 48. A line 74 connects coupling 73 with an inlet of pump 54. A valve 76 interposed in line 74 regulates the amount of fluid drawn into pump 54. Screens 43 and 51 in the platen prevent the flexible diaphragms 44 and 49 respectively from collapsing and provide for a substantially even flow of fluid through the platen chambers.

In operation, apparatus 10 is a continuously operating process of packaging a plurality of articles 16 between sheet members 12 and 14. The sheet members 12 and 14 are initially placed between the belts 22 and 28 before the apparatus is started. Operation of motor 26 drives the belts to continuously pull bottom sheet 12 and top sheet 14 through apparatus 10 and between the flexible diaphragms of platens 36 and 37. The dispenser unit 17 operates to deposite discrete amounts of material in selected positions on bottom sheet 12. Articles 16 may be any object which can be encased between sheets of heat sealable material.

Operation of pump 54 continuously circulates fluid through heater 56 and chambers 46 and 52 of the platens 36 and 37 respectively. The temperature of the fluid and the amount or rate of flow through the platens is regulated to keep the temperature at a predetermined value according to the heat sealing requirements of the sheet material. Cylinder unit 62 operated on movement of lever 67 will increase the pressure of the fluid in the circuit thereby expanding the flexible diaphragms 44 and 49 forcing the adjacent runs of belts 22 and 28 toward each other with the result that the bottom sheet member and the top sheet member are held in surface engagement with each other. Belts 22 and 28 and diaphragms 44 and 49 have sufficient flexibility to permit the articles to deform these members without applying excessive pressure on the articles. Fluid flowing through platen chambers 46 and 52 has sufficient temperature to affect heat sealing of the sheet members forced together by the pressure of the fluid so that engaged portions between the articles are joined together. The belts 22 and 28 slide over the membrane surfaces which apply an uniform pressure over a substantial area of the sheet members. The screens 43 and 51 in the platens function as baffles to distribute the flow of fluid through the chambers thereby providing uniform temperature over the entire surface. In addition, the screens prevent portions of the diaphragms from being drawn toward the fluid exit opening in couplings 69 and 73.

The pressure of fluid in the system may be varied by the use of the cylinder unit 62. The movement of the lever 67 to the left, as shown in FIG. 1, reduces the fluid pressure to a minimum and draws fluid from chambers 46 and 52 wherein the diaphragms 44 and 49 move away from the adjacent runs of belts 22 and 28 to relieve all the pressure on sheet members 12 and 14. This permits quick threading of the apparatus with new sheet material to start a new run. In addition, the pressure may be varied according to the requirements of the article and the sheet material used to enclose the article.

Referring to FIG. 5, there is shown a modified apparatus as indicated generally at 77 for heat sealing members into a welded sheet 78 having a plurality of connected passageways. One sheet member has grooves or channel portions 79 forming passageways 81 with the other sheet member. The level portions of the sheet members form a continuous welded sheet having interconnected passageways 81 for receiving materials, as liquids, semi-solids and gases. An example of a welded sheet member 78 is shown in FIG. 7 wherein the sheet member has interconnected passageways 81 open to the edges to receive pressure monitoring equipment (not shown).

Referring to FIG. 5, apparatus 77 has a flat box-like support 82 having a flat top wall 83 forming with the remainder of the support a chamber 84 open to a line 86 connected to a source of vacuum 87. Wall 83 is made of a heat insulative material. The top surface of support 82 has a plurality of downwardly projected grooves 88 in a rectangular coordinate pattern as indicated by the coordinate pattern of passageways 81 of sheet 78, shown in FIG. 7. Each groove is connected with a plurality of passages 89 to the chamber 84. On application of a vacuum pressure to chamber 84, sheet material lying on the top surface of top wall 83 is drawn into the grooves 88 while being heated by the platen forming the passageways 81.

The heat sealable sheet members forming the welded sheet 78 are secured together with the use of a platen indicated generally at 91 which applies with heated fluid under pressure and a flexible diaphragm uniform pressure and heat to the sheet members to perfect a heat seal operation. The diaphragm 98 is made from material choseen to be flexible enough to conform to minor irregularities in the support surface but inflexible enough not to drive the upper sheet down into the bottom sheet grooves. Platen 91 is carried on a pair of supports 92 and 93 located above the top wall 83. The details of platen 91 are identical with the structure of platens 36 and 37 and include a plate 94 having downwardly projected side flanges 96 to form a pan shaped member. A screen 97 extends across the pan and is secured to the flanges 96. A flexible diaphragm 98 located over screen 97 and about side flanges 96 is secured at its upper edge by fastening members 99 to the edges of the plate 94. The plate 94 and diaphragm 98 define a chamber 100 which is divided by screen 97.

A fluid circuit indicated generally at 101 is used to circulate heated fluid through chamber 100 and apply pressure on the diaphragm 98 urging the flat bottom portion of the diaphragm toward support top wall 83. Fluid circuit 101 comprises a pump 102 which delivers fluid under pressure to a heater 103. A line or pipe 104 connected to the discharge opening of heater 103 delivers the fluid to one side of platen 91. Line 104 has a plugged inlet 105, a temperature gauge 106 and a valve 107 adjustable to control the rate of flow of fluid into chamber 100. The opposite side of plate 94 is connected to a return line 108 leading to the inlet of pump 102. A valve 109 interposed in line 108 controls the flow of fluid to pump 102.

The pressure of the fluid in the fluid circuit is controlled by a pressure applying means, as a cylinder unit indicated generally at 111. Cylinder unit 111 comprises an elongated cylinder 112 accommodating a reciprocating piston 113 connected to a piston rod 114. The free end or outer end of rod 114 is connected to a pivoted lever 116 which is operable to change the location of the piston relative to the cylinder thereby either increasing or decreasing the pressure of the fluid in the fluid circuit 111. The line 117 connects cylinder 112 to line 104 upstream of valve 107.

In operation, apparatus 77 is a piece-by-piece or batch operation in that the platen 91 must be retracted for each welded sheet member produced. Initially the superimposed sheets of heat sealable material are placed on the top surface of top wall 83. The platen member is expanded and the fluid heats the sheet members. The channels 79 are placed in the bottom sheet of the superimposed sheets by applying a source of vacuum to chamber 84. The vacuum pressure draws the bottom sheet material into the grooves 88 forming the passageways 81 after it reaches formable temperature. The pattern of the passageways is determined by the pattern of the grooves 88 in the top wall 83.

To weld the sheets together the fluid circuit is used to initially increase the pressure of the fluid in the circuit whereby the flexible diaphragm 98 is expanded and moves into pressure contact with the top of the top sheet. On operation of the pump and heater, heated fluid is continuously moved through chamber 100 at a temperature which is sufficient to affect a heat sealing of the sheet members to form the welded sheet member. Vacuum force may be continued to be applied to the chamber 84 at a lower pressure thereby holding the channel in the grooves 88 as to form uninterrupted passageways 81.

After the heat sealing operation is completed, pressure of the fluid circuit is released by moving lever 116 to carry piston 113 in a reverse direction to relieve the fluid pressure. This withdraws diaphragms 98 from the top surface of welded sheet member 78 whereby it may be readily removed from the apparatus.

Apparatus 77 can also be used to form temperature sensitive material, as thermoplastic sheet material, into a desired shape. A single sheet of material can be placed on the top surface of top wall 83. The sheet is heated to a flowable state by expanding the flexible membrane to transmit heat and pressure to the sheet material. With the sheet material in a flowable state it is deformed into grooves 88 by applying a source of vacuum to chamber 84. The vacuum pressure draws portions of the sheet material into grooves 88 forming channels 79. After the forming operation is completed, the flexible diaphragm is removed from the sheet material.

Shapes other than channels can be formed in the sheet material. The top wall 83 may have pockets, recesses, projections or ridges which determine the final shape of the sheet material.

Apparatus 77 may be modified to provide continuous operation by moving a number of supports, as support 82, under platen 91. The supports can be mounted on a moving conveyor or drum. A slip sheet can be interposed between the sheet members on the moving supports and diaphragm 98 to insure smooth movement of the sheet members under the platen.

This description and drawings are directed to the preferred embodiments of the heat sealing apparatus of this invention. It is intended that various omissions, substitutions, changes in dimensions and material may be made by those skilled in the art without departing from the invention. For example, a plurality of platens may be placed in line to sequentially subject the sheet members to several temperatures whereby the sheet members may be heated to a forming temperature, then to a heat seal temperature and then cooled or quenched. This is accomplished by providing a separate fluid system for each of the platens.

The invention is defined in the following claims.

The embodiments of the invention in which an exclusive property or privilege is claimed are defined as follows:

1. A method of welding sheet members made of heat sealable sheet material comprising: providing a first sheet member of heat sealable sheet material, placing articles on the first sheet member, positioning a second sheet member of heat sealable sheet material in face to face relationship with the first sheet member locating the articles between the sheet members, continuously moving the sheet members and articles between the sheet members in an elongated path with an endless moving first belt means located adjacent one side of one of the sheet members, applying heat and pressure to an elongated surface of one side of said first belt means during movement of the first belt means and sheet members in said elongated path by advancing a thin, nonelastic pliable membrane into engagement with an elongated surface of the first belt means, said membrane moving from means including an opening having a smaller transverse area than the surface area of said membrane with heated fluid under pressure located in a first chamber defined by said membrane and means to continuously weld the first and second sheet members together around the articles during movement of the sheet members, and continuously removing the welded sheet members carrying the articles from the first belt means.

2. The method defined in claim 1 including: applying heat and pressure to a surface of one side of the other sheet member opposite the one sheet member during movement of the sheet members in the elongated path.

3. The method defined in claim 1 including: applying heat and pressure to a surface of a second moving belt means opposite the one sheet member during movement of the sheet members in the elongated path by advancing a second thin, nonelastic pliable membrane into engagement with an elongated surface of the second belt means, said membrane moving from means including an opening having a smaller transverse area than the surface area of said second membrane with heated fluid under pressure located in a second chamber adjacent the second membrane.

4. The method defined in claim 3 including: continuously circulating heated fluid through said first and second chambers to constantly maintain the membranes at a temperature for welding said first and second sheet members together.

5. The method defined in claim 3 wherein: part of the heated fluid vaporizes to increase the volume of fluid in the first and second chambers.

6. The method defined in claim 1 including: continuously circulating heated fluid through said first chamber to constantly maintain the membrane at a temperature for welding said first and second sheet members together.

7. The method defined in claim 1 wherein: part of the heated fluid vaporizes to increase the volume of fluid in the first chamber.

References Cited
UNITED STATES PATENTS

| | | | |
|---|---|---|---|
| 2,466,735 | 4/1949 | Piazze | 156—73 X |
| 2,680,470 | 6/1954 | Stanton | 156—73 |
| 2,945,976 | 7/1960 | Fridrich et al. | 156—285 |
| 2,978,008 | 4/1961 | Conti | 156—285 |
| 3,130,101 | 4/1964 | Grittins et al. | 156—256 |
| 3,085,144 | 4/1963 | Bate | 156—73 |

BENJAMIN A. BORCHELT, Primary Examiner

J. V. DORAMUS, Assistant Examiner

U.S. Cl. X.R.

156—285